United States Patent
Lee et al.

(10) Patent No.: US 9,463,607 B2
(45) Date of Patent: *Oct. 11, 2016

(54) WATERPROOF SOUND-PERMITTING SHEET, METHOD OF MANUFACTURING SAME, AND ELECTRONIC DEVICE PROVIDED WITH WATERPROOF SOUND-PERMITTING SHEET

(71) Applicant: AMOGREENTECH CO., LTD., Gimpo-si (KR)

(72) Inventors: Seung Hoon Lee, Goyang-si (KR); Jun Sik Hwang, Incheon (KR); Yong Sik Jung, Namyangju-si (KR)

(73) Assignee: AMOGREENTECH CO., LTD. (KR)

( * ) Notice: Subject to any disclaimer, the term of this patent is extended or adjusted under 35 U.S.C. 154(b) by 57 days.

This patent is subject to a terminal disclaimer.

(21) Appl. No.: 14/540,343

(22) Filed: Nov. 13, 2014

(65) Prior Publication Data

US 2015/0070842 A1    Mar. 12, 2015

Related U.S. Application Data

(63) Continuation-in-part of application No. PCT/KR2013/004064, filed on May 9, 2013.

(30) Foreign Application Priority Data

May 18, 2012 (KR) .................. 10-2012-0053145
May 7, 2013 (KR) .................. 10-2013-0051384

(51) Int. Cl.
B32B 5/26      (2006.01)
H05K 7/20     (2006.01)

(Continued)

(52) U.S. Cl.
CPC . *B32B 5/26* (2013.01); *B32B 7/12* (2013.01); *D01D 5/0038* (2013.01); *D01F 1/04* (2013.01); *B32B 2262/0238* (2013.01);

(Continued)

(58) Field of Classification Search
CPC ............. B32B 7/12; B32B 5/26; D01F 1/04; D01D 5/0038

See application file for complete search history.

(56) References Cited

U.S. PATENT DOCUMENTS

2012/0040581 A1* 2/2012 Kim .................. C04B 35/62218
                                                                   442/330
2013/0099411 A1    4/2013 Horie et al.

(Continued)

FOREIGN PATENT DOCUMENTS

JP           08232170        9/1996
KR    1020090128097    12/2009

(Continued)

OTHER PUBLICATIONS

Translation of WO 2011/040752, Paik et al, Apr. 7, 2011, p. 1-13.*

(Continued)

*Primary Examiner* — Hai Vo
(74) *Attorney, Agent, or Firm* — Cantor Colburn LLP

(57) ABSTRACT

Provided is a waterproof sound-permitting sheet, including: a porous nanoweb that has a plurality of pores and that is formed by electrospinning a polymer material to which a black or a different color pigment is added, thereby shortening a manufacturing process and improving waterproofing performance and sound-permitting performance.

5 Claims, 4 Drawing Sheets

(51) Int. Cl.
  *D01D 5/00*   (2006.01)
  *B32B 27/30*  (2006.01)
  *B32B 7/12*   (2006.01)
  *D01F 1/04*   (2006.01)

(52) U.S. Cl.
  CPC ... *B32B 2307/10* (2013.01); *B32B 2307/4026* (2013.01); *B32B 2307/724* (2013.01); *B32B 2307/7265* (2013.01); *B32B 2457/00* (2013.01); *Y10T 442/626* (2015.04); *Y10T 442/671* (2015.04); *Y10T 442/673* (2015.04); *Y10T 442/674* (2015.04); *Y10T 442/696* (2015.04)

(56) References Cited

U.S. PATENT DOCUMENTS

2015/0071472 A1* 3/2015 Lee .................. H04R 1/023
                                              381/334

2016/0010249 A1* 1/2016 Hwang ............... D04H 1/4291
                                                428/69

FOREIGN PATENT DOCUMENTS

| KR | 1020090128104 | 12/2009 |
| KR | 1020100024119 | 3/2010 |
| KR | 1020100041839 | 4/2010 |
| KR | WO 2011040752 A3 * | 9/2011 | ............... C09J 9/02 |

OTHER PUBLICATIONS

International Search Report—PCT/KR2013/004064 dated Aug. 23, 2013.

* cited by examiner

WATERPROOF SOUND-PERMITTING SHEET, METHOD OF MANUFACTURING SAME, AND ELECTRONIC DEVICE PROVIDED WITH WATERPROOF SOUND-PERMITTING SHEET

CROSS REFERENCE TO RELATED APPLICATIONS

This application is a continuation-in-part application of PCT Application No. PCT/KR2013/004064, filed on May 9, 2013, which claims priority to and the benefit of Korean Application Nos. 10-2012-0053145 filed on May 18, 2012 and 10-2013-0051384 filed on May 7, 2013, the entire contents of which are incorporated herein by reference.

TECHNICAL FIELD

The present invention relates to a technology that is provided for sound holes or air vents of a speaker or microphone of an electronic device so that sound and air is passed but water is blocked, and more particularly, to a waterproof sound-permitting sheet produced by an electrospinning method, a manufacturing method thereof, and an electronic device provided with the waterproof sound-permitting sheet.

BACKGROUND ART

Recently, since it is easy to carry and use portable electronic devices, the use of the portable electronic devices is increasing day by day. These portable electronic devices such as portable terminals, digital cameras, or notebook computers may be required to have a waterproof function due to they are carried and used with the portability. However, sound holes are formed to emit sound at a portion where a speaker or microphone is installed, and accordingly water and dust are penetrated into an electronic device through the sound holes.

Thus, a waterproof sound-permitting sheet is provided in the sound holes to pass the sound but to block water or dust. For water resistance of the waterproof sound-permitting sheet, it is advantageous to reduce an average diameter of fine holes, and for sound-permittivity of the waterproof sound-permitting sheet, it is advantageous to enlarge the size of the fine holes. Therefore, it is important to maintain the average diameter of the fine holes as appropriate so as to satisfy two conditions such as the sound-permittivity and the waterproof.

As disclosed in Korean Patent Application Publication No. 10-2010-0041839 (published on Apr. 22, 2010), a conventional waterproof sound-permitting film includes a polytetrafluoroethylene porous film, in which the polytetrafluoroethylene porous film includes: a first porous layer; and a second porous layer stacked on and integrated with the first porous layer based on a settlement force acting between a matrix of polytetrafluoroethylene, surface density of the waterproof sound-permitting film is 1 to 20 g/m2, the first porous layer and the second porous layer are biaxially oriented, and a draw ratio of the first porous layer is equal to that of the second porous layer.

Such a waterproof sound-permitting film is configured to have a double layer structure formed of the first porous layer and the second porous layer, to thereby improve the waterproof performance. However, since the conventional waterproof sound-permitting film is formed of only a polytetrafluoroethylene porous film, fine holes of the porous film will increase gradually in size due to the pressure of the shock or sound externally applied due to the long use, and thus there is a problem that waterproof performance is reduced.

SUMMARY OF THE INVENTION

To solve the above problems or defects, it is an object of the present invention to provide a waterproof sound-permitting sheet that is produced by an electrospinning method to thus have a plurality of pores in a nanoweb form, a manufacturing method thereof, and an electronic device provided with the waterproof sound-permitting sheet.

In addition, it is another object of the present invention to provide a waterproof sound-permitting sheet, a manufacturing method thereof, and an electronic device provided with the waterproof sound-permitting sheet, in which a pigment is added in a polymer material when a porous nanoweb is manufactured by an electrospinning method, to thereby delete an operation of coating the pigment, and to thus shorten a production process and improve waterproof performance and sound-permitting performance.

In addition, it is still another object of the present invention to provide a waterproof sound-permitting sheet, a manufacturing method thereof, and an electronic device provided with the waterproof sound-permitting sheet, in which a porous nanoweb is formed by an electrospinning method, to thereby adjust the thickness of the nanoweb, the average diameter of the pores, and the number of pores, in various types, and to thus be applicable for various products.

In addition, it is still another object of the present invention to provide a waterproof sound-permitting sheet, a manufacturing method thereof, and an electronic device provided with the waterproof sound-permitting sheet, in which a variety of colors of waterproof sound-permitting sheets can be implemented by adding a pigment to a polymer material, which can satisfy both waterproof performance and sound-permitting performance.

The technical problems to be solved in the present invention are not limited to the above-mentioned technical problems, and the other technical problems that are not mentioned in the present invention may be apparently understood by one of ordinary skill in the art in the technical field to which the present invention belongs.

To accomplish the above and other objects of the present invention, according to an aspect of the present invention, there is provided a waterproof sound-permitting sheet comprising: a porous nanoweb that has a plurality of pores and that is formed by electrospinning a polymer material to which a black or different color pigment is added.

Preferably but not necessarily, the porous nanoweb comprises: a first nanoweb layer that has a plurality of pores and that is formed by electrospinning a polymer material; and a second nanoweb layer that is formed on one or both surfaces of the first nanoweb layer, in which the second nanoweb layer has a plurality of pores and that is formed by electrospinning a polymer material to which a black or different color pigment is added.

According to another aspect of the present invention, there is provided a method of manufacturing a waterproof sound-permitting sheet, the method comprising: preparing a spinning solution that is formed by adding a black or different color pigment to a polymer material; and spinning the spinning solution, thereby forming a nanoweb layer having a plurality of pores and having a black or different color.

According to another aspect of the present invention, there is provided a method of manufacturing a waterproof sound-permitting sheet, the method comprising: preparing a first spinning solution that is formed by dissolving a polymer material in a solvent; preparing a second spinning solution that is formed by adding a black or different color pigment to a polymer material; spinning the first spinning solution, thereby forming a first nanoweb layer having a plurality of pores; and spinning the second spinning solution on one or both surfaces of the first nanoweb layer, thereby forming a second nanoweb layer on the one surface of the first nanoweb layer, or second and third nanoweb layers on both the surfaces of the first nanoweb layer, each having a plurality of pores and having a black or different color.

As described above, the waterproof sound-permitting sheet according to the present invention is configured by forming a porous nanoweb having a plurality of pores by an electrospinning method, thereby having advantages of adjusting the thickness of the nanoweb, an average diameter of pores, and the number of pores in various types and being applied to a wide range of products and of simultaneously satisfying both the waterproof performance and the sound-permitting performance.

In addition, the waterproof sound-permitting sheet according to the present invention is configured by adding a pigment to a polymer material when manufacturing a porous nanoweb by an electrospinning method, to thereby delete an operation of coating the pigment, to thus shorten a production process, and to improve the waterproof performance and the sound-permitting performance.

Further, the waterproof sound-permitting sheet according to the present invention is formed into a variety of colors of waterproof sound-permitting sheets as well as a black waterproof sound-permitting sheet by adding a pigment to a polymer material, which can satisfy both waterproof performance and sound-permitting performance.

DETAILED DESCRIPTION OF THE INVENTION

Figure 1:
FIG. 1 is a cross-sectional view of a waterproof sound-permitting sheet according to a first embodiment of the present invention.

Embodiments of the present invention will be described below in detail with reference to the accompanying drawings. Here, the size or shape of the components illustrated in the drawings may be shown to be exaggerated for convenience and clarity of illustration. In addition, specifically defined terms may be changed according to the intention or practices of users or operators in consideration of the construction and operation of the present invention. The definition of the terms should be made based on contents throughout the present specification.

Figure 2:
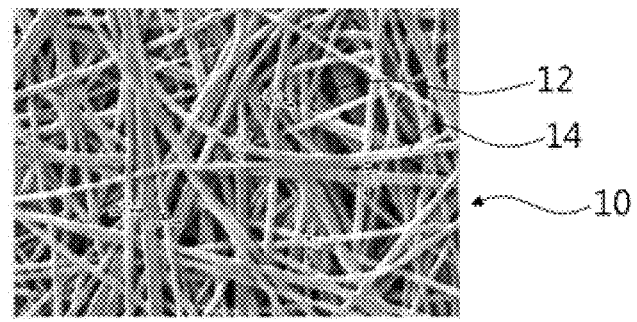
FIG. 2 is an enlarged close-up photograph of a waterproof sound-permitting sheet according to the first embodiment of the present invention.

As shown in FIGS. 1 and 2, a waterproof sound-permitting sheet according to a first embodiment of the present invention includes: a porous nanoweb 10 that has a plurality of pores and that is formed by electrospinning a polymer material to which a black or different color pigment is added.

The porous nanoweb 10 is formed into a shape having a plurality of pores 12, by making ultra-fine fiber strands 14 by electrospinning a polymer material to which the black or different color pigment is added, and accumulating the ultra-fine fiber strands 14.

The polymer material used to make the porous nanoweb 10 in the present invention may be a resin that may be dissolved in an organic solvent for electrospinning, and that may be capable of forming nanofibers by electrospinning, but are not specifically limited thereto.

For example, the polymer materials used in the present invention may be: polyvinylidene fluoride (PVdF), poly (vinylidene fluoride-co-hexafluoropropylene), a perfluoropolymer, polyvinyl chloride, polyvinylidene chloride, or a copolymer thereof; a polyethylene glycol derivative containing polyethylene glycol dialkylether and polyethylene glycol dialkylester; poly(oxymethylene-oligo-oxyethylene); polyoxide containing polyethylene oxide and polypropylene oxide; polyvinyl acetate, poly(vinyl pyrrolidone-vinyl acetate), polystyrene, and a polystyrene acrylonitrile copolymer; a polyacrylonitrile copolymer containing polyacrylonitrile (PAN) and a polyacrylonitrile methyl methacrylate copolymer; or polymethyl methacrylate, a poly methyl methacrylate copolymer, or a mixture thereof.

Further, the polymer material used in the present invention may be: aromatic polyester such as polyamide, polyimide, polyamideimide, poly(meta-phenylene isophthal amide), polyester sulfone (PES), polyether ketone, polyetherimide (PEI), polyethylene terephthalate, polytrimethylene terephthalate, or polyethylene naphthalate; polyphosphazene such as polytetrafluoroethylene, polydifenoxiphosphazene, or poly{bis[2-(2-methoxyethoxy) phosphazene]}; polyurethane, and polyurethane copolymer containing polyether urethane; or cellulose acetate, cellulose acetate butyrate, or cellulose acetate propionate.

The polymer material that may be particularly desirably used to make a porous nanoweb according to the present invention may be polyacrylonitrile (PAN), polyvinylidene fluoride (PVdF), polyester sulfone (PES), and polystyrene (PS), alone or a mixture of polyvinylidene fluoride (PVdF) and polyacrylonitrile (PAN), a mixture of PVdF and PES, or a mixture of PVdF and thermoplastic polyurethane (TPU).

Thus, the polymer that may be used in the present embodiment is not particularly limited to thermoplastic and thermosetting polymers that may be air-electrospinnable.

The solvent that may be used in the present embodiment may be any one of DMAc (N,N-Dimethyl acetoamide), DMF (N,N-Dimethylformamide), NMP (N-methyl-2-pyrrolidinone), DMSO (dimethyl sulfoxide), THF (tetra-hydrofuran), EC (ethylene carbonate), DEC (diethyl carbonate), DMC (dimethyl carbonate), EMC (ethyl methyl carbonate), PC (propylene carbonate), water, acetic acid, formic acid, chloroform, dichloromethane, and acetone or a mixture thereof.

Since the porous nanoweb 10 is produced by an electrospinning method, the thickness of the porous nanoweb 10 is determined according to the dose of the electrospun polymer material. Thus, it is advantageously easy to make the thickness of the porous nanoweb 10 into a desired thickness. That is, if the dose of the electrospun polymer material is made less, the thickness of the porous nanoweb 10 may be made thin, and since the dose of the electrospun polymer material is little, the production cost can be reduced that much.

Here, it is determined that the porous nanoweb 10 has the number of pores and an average diameter of pores, depending on the thickness of the porous nanoweb 10. Accordingly, the thickness of the porous nanoweb 10 is made thicker in order to improve the waterproof performance, and the thickness of the porous nanoweb 10 is made thinner in order to improve the sound-permitting performance.

Thus, a variety of different types of waterproof sound-permitting sheets whose waterproof and sound-permitting features vary according to functions and types of electronic devices can be made.

The diameters of the fiber strands 14 are in the range of 0.3~1.5 μm. Then, the average pore size is up to 1.5~2 μm, and the minimum pore size is not limited. That is, the average pore size is preferably not more than 2 μm.

In addition, since the ultra-fine fiber strands 14 are accumulated and formed in the case of the porous nanoweb 10, a myriad of irregular pores are formed, which is more effective in improving the waterproof performance and the sound-permitting performance at the same time.

The pigments are used to prepare the waterproof sound-permitting sheet of black or another color, in which a variety of colors or tones can be implemented in accordance with the amount and the type of the applied pigment.

In this embodiment, a pigment is added in the polymer material to then be electrospun. Accordingly, an operation of coating a pigment on the surface of the porous nanoweb can be removed, to thus provide an effect of reducing the manufacturing process, and to make the average diameter of pores precisely.

Gravure printing, coating, etc., may be used as the existing method of applying a pigment on the surface of the porous nanoweb. When a pigment is coated in this way to thus implement a color, problems such as degradation of the air permeability and low color fastness may occur. In this embodiment, a pigment is added in the polymer material to thus prepare nanowebs. Accordingly, the fastness of the color can be inherently improved, the waterproof performance, the sound-permitting performance, and the air-permitting performance can be improved, and air permeability can be prevented from being lowered.

Then, the waterproof sound-permitting sheet according to the present embodiment is oil-repellent finish treated on the surface thereof so as to further improve the waterproof performance. Here, the oil-repellent finish is formed by treating an organic fluorine compound on the surface of the porous nanoweb 10 or the surface of a porous substrate.

Besides, in addition to the above oil-repellent finish treatment, various ways can be applied for the oil-repellent finish treatment.

Then, the waterproof sound-permitting sheet according to the present embodiment can be used a waterproof air-permitting sheet that passes heat or air but blocks water or dirt.

Figure 3:
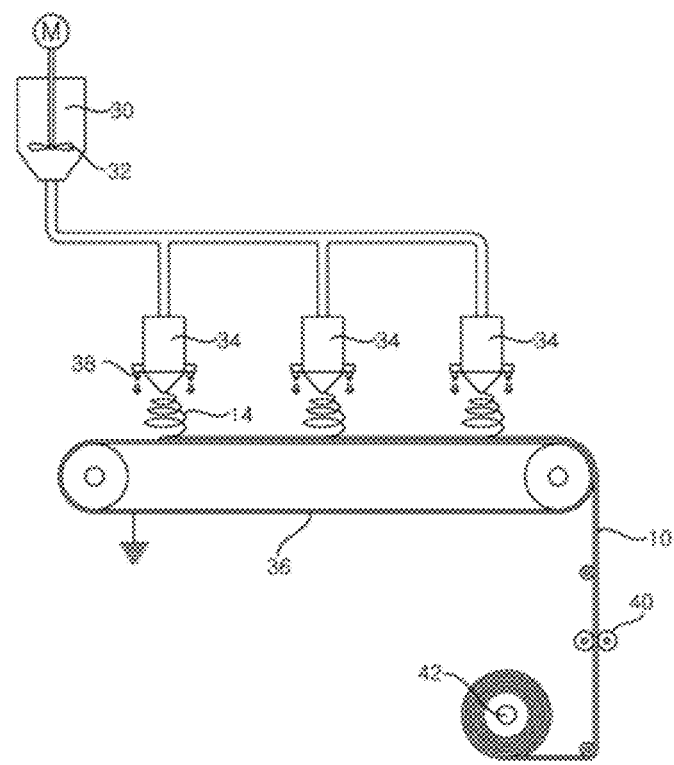
FIG. 3 is a configuration diagram of an electrospinning apparatus for producing a waterproof sound-permitting sheet according to the first embodiment of the present invention.

As shown in FIG. 3, an electrospinning apparatus for producing a waterproof sound-permitting sheet according to the first embodiment of the present invention includes: a mixing tank 30 that stores a spinning solution that is formed by mixing a polymer material to which s black or different color pigment is added with a solvent; a plurality of spinnerets 34 that are connected to a high voltage generator and connected to the mixing tank 30, to thus spinning ultra-fine fiber strands 14; and a collector 36 on which the ultra-fine fiber strands 14 spun from the spinnerets 34 are accumulated to thereby produce a porous nanoweb 10.

The mixing tank 30 is provided with a stirrer 32 that mixes evenly the polymer material, the pigment, and the solvent, and that also maintains the polymer material to have a certain viscosity.

A high voltage electrostatic force of 90~120 Kv is applied between the collector 36 and the spinnerets 34, and the ultra-fine fiber strands 14 are spun from the spinnerets 34. Accordingly, the porous nanoweb 10 is formed on the collector 36.

An air injection device 38 is provided to each of the spinnerets 34, to spray air to the fiber strands 14 that are spun from the spinnerets 34, to thereby guide the fiber strands 14 to be collected toward the collector 36.

If a multi-hole spin pack having a number of holes is applied for mass production, mutual interference occurs between multiple holes, and thus fibers not collected while flying. As a result, since the porous nanoweb 10 that is obtained by using the multi-hole spin pack become too bulky, it may be difficult to form the porous nanoweb 10 and may act as a cause of the trouble of the spin.

Therefore, in the present embodiment to solve this problem, a multi-hole spin pack is used and an air injection device 38 is provided at each spinneret. Accordingly, when the fiber strands 14 are spun, air is injected so that the fiber strands 14 are well collected on the collector 36.

An air pressure of an air injection device of a multi-hole spin pack nozzle is set in the range of 0.1 to 0.6 Mpa. In this case, the air pressure that is less than 0.1 MPa does not contribute to a trapping/accumulation, and the air pressure that exceeds 0.6 Mpa hardens a needle of the spin nozzle firmly to thus raise a phenomenon of blocking the needle thereby causing a spin trouble.

The collector 36 may be configured to employ a conveyor for transporting nanowebs such that the ultra-fine fiber strands 14 spun from the plurality of spinnerets 34 are sequentially accumulated on the conveyor.

A pressing roller 40 is provided in the rear of the collector 36, in which the pressing roller 40 presses the porous nanoweb 10 fabricated by an electrospinning method to make the nanoweb 10 to a predetermined thickness, and a nanoweb roll 42 is provided in which the porous nanoweb 10 pressed through the pressing roller 40 is wound on the nanoweb roll 42.

The process of manufacturing the waterproof sound-permitting sheet by using the electrospinning device will follow. When the collector 36 is driven, a release film is moved on the upper surface of the collector 36. In addition, a high voltage electrostatic force is applied between the collector 36 and the spinnerets 34, and thus the polymer material to which the pigment is added is made into the ultra-fine fiber strands 14 to then be spun to the surface of the release film. Then, the ultra-fine fiber strands 14 are accumulated on the surface of the release film to thus form a porous nanoweb 10 having a black or different color and having a plurality of pores 12.

In addition, the porous nanoweb 10 is made into a certain thickness while passing through the pressure roller 40, and is wound around the nanoweb roll 42.

Figure 4:
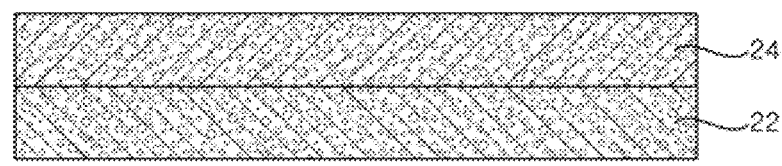
FIG. 4 is a cross-sectional view of a waterproof sound-permitting sheet according to a second embodiment of the present invention.

As shown in FIG. 4, a waterproof sound-permitting sheet according to a second embodiment of the present invention includes: a first nanoweb layer 22 that has a plurality of pores and that is formed by electrospinning a polymer material; and a second nanoweb layer 24 that is formed on one surface of the first nanoweb layer 22, in which the second nanoweb layer 24 has a plurality of pores and that is formed by electrospinning a polymer material to which a black or different color pigment is added.

The first nanoweb layer 22 is formed into a shape having a plurality of pores, by making ultra-fine fiber strands by electrospinning the polymer material, and accumulating the ultra-fine fiber strands, thereby playing a role of a substrate for use in the waterproof sound-permitting sheet. The first nanoweb layer 22 may be any one of the polymer materials described in the first embodiment of the present invention. In particular, polyvinylidene fluoride (PVdF) is preferably used for the first nanoweb layer 22.

The second nanoweb layer 24 is formed into a shape having a plurality of pores, by making ultra-fine fiber strands by electrospinning the polymer material to which a pigment is added, and accumulating the ultra-fine fiber strands, thereby playing a role of a color layer for use in the waterproof sound-permitting sheet. The second nanoweb layer 24 may be any one of the polymer materials described in the first embodiment of the present invention, to which a pigment is added. In particular, polyvinylidene fluoride (PVdF) to which a pigment is added is preferably used for the second nanoweb layer 24.

The waterproof sound-permitting sheet according to the second embodiment of the present invention can implement functions of waterproof performance, sound-permitting performance, and air-permeability with the first nanoweb layer 22, and can implement a black or different color as well as functions of waterproof performance, sound-permitting performance, and air-permeability with the second nanoweb layer 24 that is stacked on one surface of the first nanoweb layer 22, to thereby achieve and provide a more high-performance waterproof sound-permitting sheet.

Figure 5:
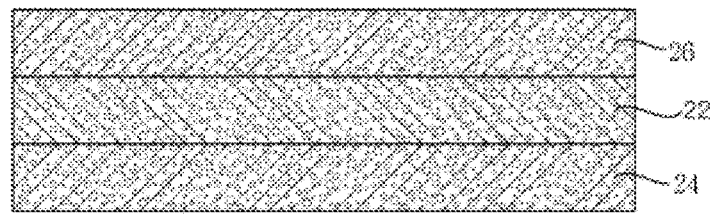
FIG. 5 is a cross-sectional view of a waterproof sound-permitting sheet according to a third embodiment of the present invention.

As shown in FIG. 5, a waterproof sound-permitting sheet according to a third embodiment of the present invention includes: a first nanoweb layer 22 that has a plurality of pores and that is formed by electrospinning a polymer material; a second nanoweb layer 24 that is formed on one surface of the first nanoweb layer 22, in which the second nanoweb layer 24 has a plurality of pores and that is formed by electrospinning a polymer material to which a black or different color pigment is added; and a third nanoweb layer 26 that is formed on the other surface of the first nanoweb layer 22, in which the third nanoweb layer 26 has a plurality of pores and that is formed by electrospinning a polymer material to which a black or different color pigment is added.

The structure of the waterproof sound-permitting sheet according to the third embodiment of the present invention is the same as that of the waterproof sound-permitting sheet described in the second embodiment of the present invention, but the structure of waterproof sound-permitting sheet according to the third embodiment of the present invention differs from that of the waterproof sound-permitting sheet described in the second embodiment of the present invention, in that the structure of the waterproof sound-permitting sheet according to the third embodiment of the present invention has a double-faced structure that the third nanoweb layer 26 that is the same as the second nanoweb layer 24 is further formed on the other surface of the first nanoweb layer 22, in addition to the second nanoweb layer 24 that is formed on one surface of the first nanoweb layer 22.

In addition, as another embodiment of the nanoweb layers, the waterproof sound-permitting sheet includes: a first nanoweb layer that has a plurality of pores and that is formed by electrospinning a polymer material to which a black or different color pigment is added; and a second nanoweb layer that is formed on one or both surfaces of the first nanoweb layer, in which the second nanoweb layer has a plurality of pores and that is formed by electrospinning a polymer material.

Figure 6:
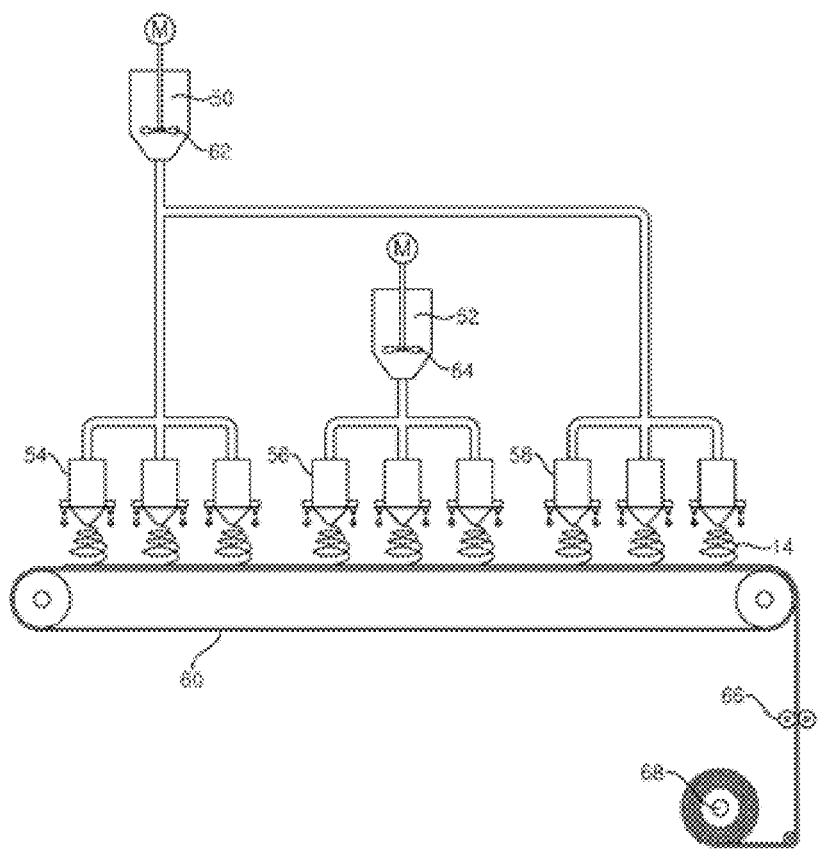
FIG. 6 is a configuration diagram of an electrospinning apparatus for producing a waterproof sound-permitting sheet according to the third embodiment of the present invention.

As shown in FIG. 6, an electrospinning apparatus for producing a waterproof sound-permitting sheet according to the third embodiment of the present invention includes: a first mixing tank 50 that mixes a polymer material to which s black or different color pigment is added with a solvent and stores the first mixture; a second mixing tank 52 that mixes a polymer material with a solvent and stores the second mixture; a plurality of first spinnerets 54 that are connected to a high voltage generator and connected to the first mixing tank 50, and that spin ultra-fine fiber strands, to thereby form a second nanoweb layer; a plurality of second spinnerets 56 that are disposed in the rear side of the first spinnerets 54, that are connected to the second mixing tank 52, and that spin ultra-fine fiber strands, to thereby form a first nanoweb layer; a plurality of third spinnerets 58 that are disposed in the rear side of the second spinnerets 56, that are connected to the first mixing tank 50, and that spin ultra-fine fiber strands, to thereby form a third nanoweb layer; and a collector 60 on which the ultra-fine fiber strands spun from the first to third spinnerets 54, 56, and 58 are accumulated to thereby produce a multilayered porous nanoweb.

The first mixing tank 50 is provided with a stirrer 62 that mixes evenly the polymer material, the pigment, and the solvent, and that also maintains the polymer material to have a certain viscosity, and the second mixing tank 52 is provided with a stirrer 64 that mixes evenly the polymer material and the solvent, and that also maintains the polymer material to have a certain viscosity.

A pressing roller 66 is provided in the rear of the collector 60, in which the pressing roller 66 presses the multilayered porous nanoweb fabricated by an electrospinning method to make the multilayered porous nanoweb to a predetermined thickness, and a nanoweb roll 68 is provided in which the multilayered porous nanoweb is wound on the nanoweb roll 68.

The process of manufacturing the waterproof sound-permitting sheets according to the second and third embodiments by using the above-described electrospinning device will follow. A high voltage electrostatic force is applied between the collector 60 and the first spinnerets 54, and thus the polymer material to which the pigment is added is made into the ultra-fine fiber strands in the first spinnerets 54, to then be spun to the upper surface of the collector 60. Then, a second nanoweb layer 24 having a black or different color and having a plurality of pores 12 is formed on the upper surface of the collector 60.

In addition, when the collector 60 is driven, the second nanoweb layer 24 is moved to the second spinnerets 56.

Then, a high voltage electrostatic force is applied between the collector 60 and the second spinnerets 56, and thus the polymer material is made into the ultra-fine fiber strands in the second spinnerets 56, to then be spun to the upper surface of the second nanoweb layer 24, to thereby form a first nanoweb layer 22 on the second nanoweb layer 24.

In addition, when the collector 60 is driven, the first nanoweb layer 22 is moved to the third spinnerets 58. Then, a high voltage electrostatic force is applied between the collector 60 and the third spinnerets 58, and thus the polymer material to which the pigment is added is made into the ultra-fine fiber strands in the third spinnerets 58, to then be spun to the upper surface of the first nanoweb layer 22, to thereby form a third nanoweb layer 26 on the first nanoweb layer 22.

Here, if the operation of forming the third nanoweb layer 26 is deleted, the waterproof sound-permitting sheets according to the second embodiment are obtained.

Figure 7:
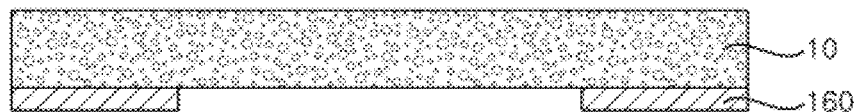
FIG. 7 is a cross-sectional view of a waterproof sound-permitting sheet according to a fourth embodiment of the present invention.

As illustrated in FIG. 7, a waterproof sound-permitting sheet according to a fourth embodiment of the present invention, includes: a porous nanoweb 10 that has a plurality of pores and that is formed by electrospinning a polymer material to which a black or different color pigment is added; and a double-sided adhesive tape 160 that is formed on one surface of the porous nanoweb 10.

Since the structure of the porous nanoweb 10 is the same as that of the porous nanoweb 10 described in the first embodiment, the detailed description thereof will be omitted.

The double-sided adhesive tape 160 is formed along the edge of the porous nanoweb 10 and serves to attach the waterproof sound-permitting sheet on a portion of the sound holes of an electronic device. Here, the double-sided adhesive tape 160 may be configured to employ a non-substrate type or a substrate type, a conventional double-sided adhesive tape, or a double-sided adhesive tape that is formed by an electrospinning method.

Figure 8:
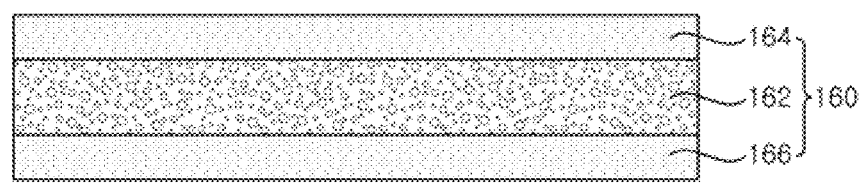
FIG. 8 is a cross-sectional view of a double-sided adhesive tape applied to a waterproof sound-permitting sheet of the present invention.

As shown in FIG. 8, the double-sided adhesive tape 160 which is formed by the electrospinning method includes: a substrate 162 that is formed into a nanoweb type having a plurality of pores by an electrospinning method; a first adhesive layer 164 that is formed into a nanoweb type by spinning an adhesive material on one surface of the substrate 162; and a second adhesive layer 166 that is formed into a nanoweb type by spinning the adhesive material on the other surface of the substrate 162.

Here, the substrate 162 is formed into a nanoweb type having a plurality of pores, in which a polymer material is made into ultra-fine fiber strands by an electrospinning method, and the ultra-fine fiber strands are accumulated on the substrate 162.

Then, the first adhesive layer 164 and the second adhesive layer 166 are formed by spinning the adhesive material on one surface and the other surface of the substrate 162, respectively. Here, the adhesive material is introduced into the pores of the substrate 162, to thus increase the amount of the adhesive in the pores. Thus, even if the double-sided adhesive tape 160 has the same thickness as the conventional double-sided adhesive tape, the amount of the adhesive is more than the conventional double-sided adhesive tape to thereby increase the adhesive force.

The double-sided adhesive tape 160 can be integrally formed in the electrospinning apparatus for forming the porous nanoweb 10, or can be prepared separately from another electrospinning apparatus to then be laminated on the other surface of the porous nanoweb.

Figure 9:
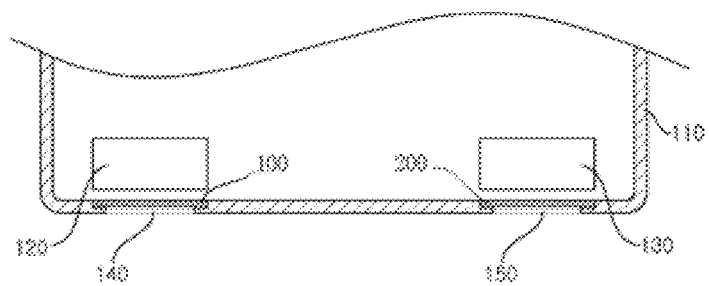
FIG. 9 is a partial sectional view of an electronic device to which a waterproof sound-permitting sheet according to the present invention is applied.
Figure 10:
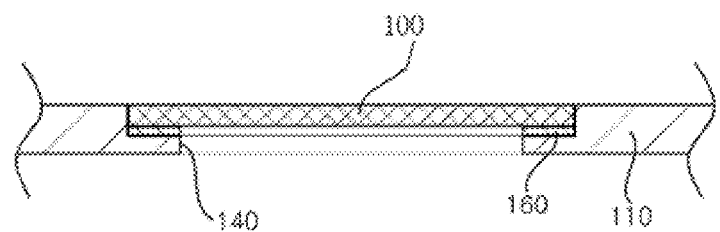
FIG. 10 is an enlarged view of essential elements of FIG. 9.

FIG. 9 is a partial sectional view of an electronic device to which a waterproof sound-permitting sheet according to the present invention is applied. FIG. 10 is an enlarged view of essential elements of FIG. 9.

The electronic device according to the present invention includes: a main body 110; a speaker 120 that is provided in the main body 110, and through which a sound is discharged to the outside from the main body 110; and a microphone 130 that is provided in the main body 110, and through which the sound is input to the main body 110, wherein sound holes 140 and 150 through which the sound passes are formed at portions where the speaker 120 and the microphone 130 are mounted in the main body 110.

Then, the waterproof sound-permitting sheets 100 and 200 according to the invention are provided on the sound holes 140 and 150, to thus block water or dust and pass the sound. Here, the waterproof sound-permitting sheets 100 and 200 may employ the waterproof sound-permitting sheets explained in the first to fourth embodiments described above. A ring-shaped double-sided adhesive tape 160 is mounted on the inner surface of the sound holes 140 and 150 to thus secure the waterproof sound-permitting sheets 100 and 200 on the inner surfaces of the sound holes 140 and 150.

The waterproof sound-permitting sheet according to the present embodiment is installed on air vent holes through which the heat of the electronic device or air is passed, in addition to the sound holes 140 and 150, and serves to pass air or heat but block water or dust.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The waterproof sound-permitting sheet according to the present invention is mounted in an electronic device to pass air or heat but block water or dust. The waterproof sound-permitting sheet according to the present invention is applied for the electronic device such as a mobile terminal that is carried and used to perform a water resistance function. In addition, the waterproof sound-permitting sheet according to the present invention is formed into a nanoweb type having a plurality of pores to be formed by an electrospinning method to thereby improve the waterproof performance and sound-permitting performance.

What is claimed is:

1. A waterproof sound-permitting sheet comprising:
   a porous nanoweb layer formed of accumulation of ultra-fine fiber strands and having a plurality of first pores, wherein the ultra-fine fiber strands have an average diameter in a range of 0.3-1.5 μm, the first pores have an average size in a range of 1.5 to μm, and the ultra-fine fiber strands are formed of a polymer material and a color pigment; and
   a double-sided adhesive tape stacked along an edge of the porous nanoweb layer, wherein the double-sided adhesive tape comprises: a substrate formed in a nanoweb form and having a plurality of second pores; a first adhesive layer formed on a first surface of the substrate; and a second adhesive layer formed on a second surface of the substrate, the second surface being opposite to the first surface.

2. The waterproof sound-permitting sheet according to claim 1, wherein the porous nanoweb layer comprises:
- a first nanoweb layer; and
- a second nanoweb layer formed on one or both opposite surfaces of the first nanoweb layer and including the color pigment.

3. The waterproof sound-permitting sheet according to claim 2, wherein polyvinylidene fluoride (PVdF) is used for the first nanoweb layer, and polyvinylidene fluoride (PVdF) is used for the second nanoweb layer.

4. The waterproof sound-permitting sheet according to claim 1, wherein the porous nanoweb layer comprises:
- a first nanoweb layer including the color pigment; and
- a second nanoweb layer formed on one or both opposite surfaces of the first nanoweb layer.

5. The waterproof sound-permitting sheet according to claim 4, wherein polyvinylidene fluoride (PVdF) is used for the first nanoweb layer, and polyvinylidene fluoride (PVdF) is used for the second nanoweb layer.

* * * * *